(12) United States Patent
Baker

(10) Patent No.: US 10,240,911 B2
(45) Date of Patent: Mar. 26, 2019

(54) LASER GAUGE WITH FULL AIR GAP MEASUREMENT RANGE

(71) Applicant: Advanced Gauging Technologies, LLC, Plain City, OH (US)

(72) Inventor: Derrick Baker, Columbus, OH (US)

(73) Assignee: Advanced Gauging Technologies, LLC, Plain City, OH (US)

( * ) Notice: Subject to any disclaimer, the term of this patent is extended or adjusted under 35 U.S.C. 154(b) by 0 days.

(21) Appl. No.: 15/619,951

(22) Filed: Jun. 12, 2017

(65) Prior Publication Data
US 2018/0356209 A1    Dec. 13, 2018

(51) Int. Cl.
| | |
|---|---|
| *G01B 11/00* | (2006.01) |
| *G01B 21/00* | (2006.01) |
| *G01B 11/06* | (2006.01) |
| *G01B 11/28* | (2006.01) |
| *G01B 11/14* | (2006.01) |
| *G01B 21/08* | (2006.01) |
| *G01B 21/16* | (2006.01) |
| *D21F 7/06* | (2006.01) |

(52) U.S. Cl.
CPC ............ *G01B 11/0608* (2013.01); *D21F 7/06* (2013.01); *G01B 11/14* (2013.01); *G01B 11/28* (2013.01); *G01B 21/08* (2013.01); *G01B 21/16* (2013.01)

(58) Field of Classification Search
None
See application file for complete search history.

(56) References Cited

U.S. PATENT DOCUMENTS

| | | | | | |
|---|---|---|---|---|---|
| 3,671,726 | A | * | 6/1972 | Kerr ..................... | G01B 11/06 |
| | | | | | 250/559.22 |
| 4,047,029 | A | * | 9/1977 | Allport .................. | G01N 23/16 |
| | | | | | 162/263 |

(Continued)

FOREIGN PATENT DOCUMENTS

| | | |
|---|---|---|
| WO | 96 35112 | 11/1996 |
| WO | 2015 110517 A1 | 7/2015 |

OTHER PUBLICATIONS

Advanced Gauging Technologies, LLC, AGT800 Laser Thickness Gauge, pp. 1-9, www.advgauging.com/products/agt800/.

(Continued)

*Primary Examiner* — Shawn Decenzo
*Assistant Examiner* — Jarreas C Underwood
(74) *Attorney, Agent, or Firm* — Frank H. Foster; Kremblas & Foster

(57) ABSTRACT

The entire throat height or air gap of a laser gauge's C-frame enclosure constitutes its accurate measurement range so that any material passing at any height through the air gap will be accurately measured. The laser gauge has at least one laser and usually two lasers housed in an enclosure with at least two arms that are spaced apart for receipt of a target surface in the air gap between the arms. The gauge has a first enclosure barrier attached to a first one of the enclosure arms at a first boundary of the air gap. The first enclosure barrier is positioned away from the laser at or beyond the gauge's proximal measurement limit. A second enclosure barrier is attached to a second one of the enclosure arms at a second boundary of the air gap. The second enclosure barrier is positioned away from the laser at or nearer than the gauge's distal measurement limit.

6 Claims, 2 Drawing Sheets

(56) References Cited

U.S. PATENT DOCUMENTS

| | | | | |
|---|---|---|---|---|
| 4,904,939 A * | 2/1990 | Mian | ...................... | G01B 7/06 246/169 R |
| 4,955,225 A * | 9/1990 | Kniest | .................... | G01B 17/02 73/1.81 |
| 5,210,593 A | 5/1993 | Krämer | | |
| 5,220,536 A * | 6/1993 | Stringer | ............... | G01B 11/002 367/99 |
| 5,569,835 A * | 10/1996 | Kenney | ................. | G01B 5/0014 356/630 |
| 5,581,353 A * | 12/1996 | Taylor | .................... | B31F 1/2831 250/559.23 |
| 5,636,026 A * | 6/1997 | Mian | ........................ | B61K 9/12 250/224 |
| 5,714,763 A * | 2/1998 | Chase | .................. | G01B 11/272 250/548 |
| 6,038,028 A * | 3/2000 | Grann | ................. | G01B 11/0691 356/630 |
| 6,281,679 B1 * | 8/2001 | King | ....................... | G01B 7/107 324/226 |
| 6,441,905 B1 | 8/2002 | Tojyo et al. | | |
| 6,588,118 B2 | 7/2003 | Hellstrom | | |
| 6,757,069 B2 * | 6/2004 | Bowles | .................. | G01B 11/06 250/559.27 |
| 7,026,620 B2 * | 4/2006 | Fackert | ................ | G01B 11/022 250/359.1 |
| 7,199,884 B2 | 4/2007 | Jasinski et al. | | |
| 7,319,521 B2 | 1/2008 | Typpoe et al. | | |
| 7,486,409 B2 * | 2/2009 | Yamashita | ........... | G01B 11/026 356/614 |
| 7,525,667 B2 * | 4/2009 | Mian | ....................... | B61K 9/08 356/601 |
| 7,528,400 B2 * | 5/2009 | Duck | ....................... | D21F 7/06 250/559.23 |
| 7,684,057 B2 * | 3/2010 | Sakai | .................. | G01B 11/022 356/614 |
| 8,274,663 B2 | 9/2012 | Pan | | |
| 8,913,252 B2 * | 12/2014 | Chang | .................. | G01B 21/047 356/614 |
| 9,151,595 B1 | 10/2015 | Cook et al. | | |
| 9,335,145 B2 * | 5/2016 | Sonntag | ................... | G01B 7/06 |
| 2003/0009894 A1 * | 1/2003 | Yamamoto | ................ | B07C 5/10 33/501.02 |
| 2006/0132808 A1 * | 6/2006 | Jasinski | ............. | G01B 11/0691 356/632 |
| 2010/0326618 A1 * | 12/2010 | Godin | ...................... | B22D 2/00 164/451 |
| 2012/0133954 A1 * | 5/2012 | Takabayashi | ...... | G01B 11/2536 356/610 |
| 2013/0211766 A1 * | 8/2013 | Rosenberg | ........... | G01B 21/042 702/97 |
| 2014/0240718 A1 * | 8/2014 | Chang | .................. | G01B 21/047 356/614 |
| 2016/0252343 A1 * | 9/2016 | Fuellmeier | ........... | G01B 21/042 702/97 |

OTHER PUBLICATIONS

Eric J. Reber, Non-contacting, Non-nuclear Caliper Sensor for Online Direct Thickness Gauging, Converting Quarterly, 2016 Quarter 2, pp. 1-4, www.convertingquarterly.com.

* cited by examiner

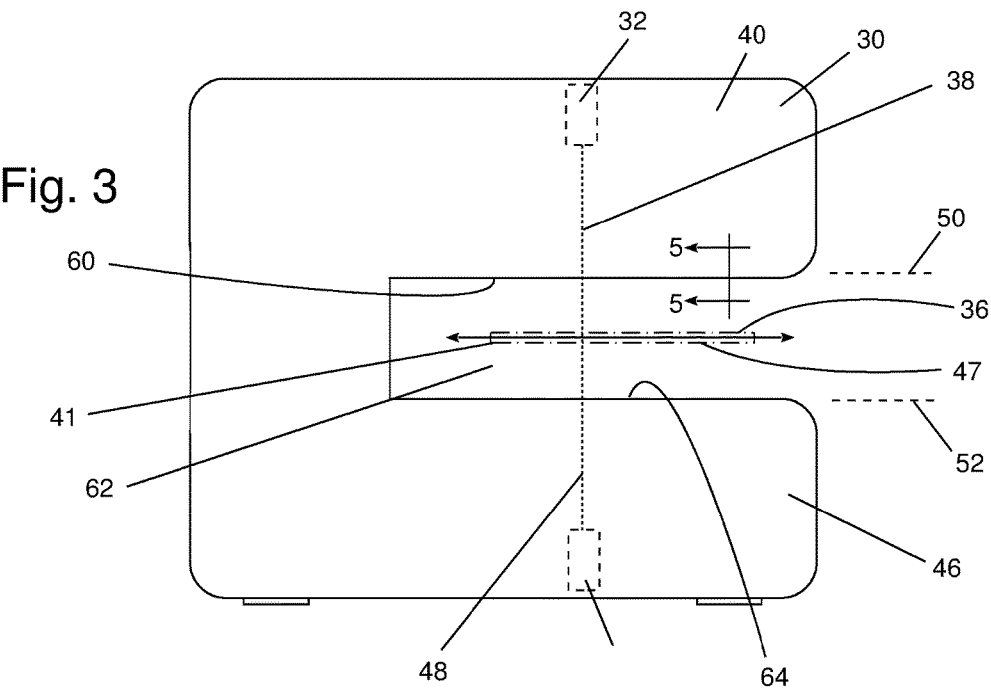
Fig. 3
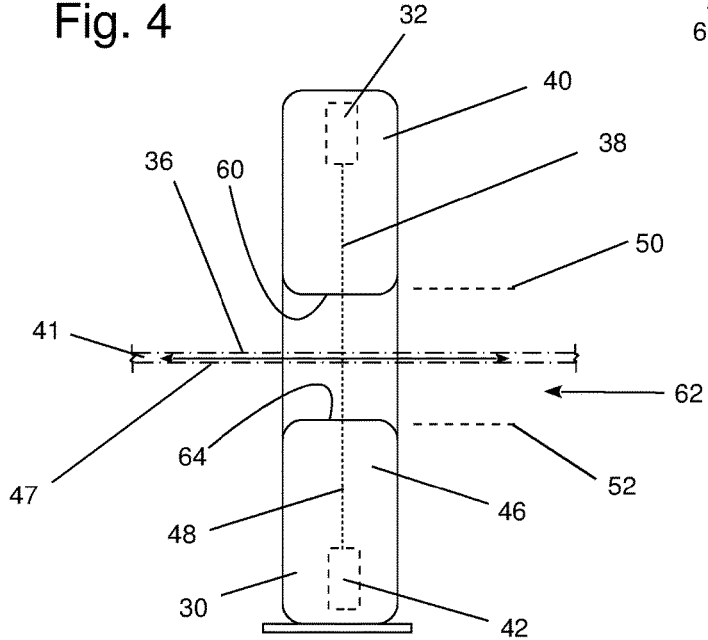
Fig. 4
Fig. 5

LASER GAUGE WITH FULL AIR GAP MEASUREMENT RANGE

CROSS-REFERENCES TO RELATED APPLICATIONS (Not Applicable)

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

This invention relates to laser gauges for accurately measuring the distance to or displacement of a target surface of an object or for measuring the thickness of a web of material, such as a web that is being conveyed along a production line. More particularly the invention relates to a laser gauge which provides accurate measurements regardless of the position of the object being measured within the throat or air gap of the gauge.

Laser displacement gauges are well known in the prior art. They typically have at least one laser displacement sensor that includes an emitter which directs a laser beam onto a target surface to form a spot of light where the laser beam is incident on the target surface and a receiver that receives a two dimensional image of the spot via reflection of the laser light that is incident on the target surface. Integrated gauges mount both the emitter and the receiver in the same housing while older technology has them spaced apart in two separate housings. Each laser displacement sensor also includes a data processing unit with stored software that analyzes the image of the spot and outputs a sensed distance to the target surface.

Two laser displacement sensors are commonly used to measure the thickness of a web of material as it is conveyed along a machine for making or processing the web. In order to measure the thickness of the web, two laser displacement sensors are positioned one on each opposite side of the web and arranged in a mirror image configuration. They direct the laser light onto the web's opposite surfaces and compute the distance between those opposite surfaces, which is the web's thickness.

The lasers sensors are usually housed in a protective instrument enclosure that typically has an internal support frame and surrounding protective enclosure walls. A common enclosure for laser thickness gauges is a C-frame or O-frame that has an upper arm, a lower arm and a body that joins the arms at one or both ends of each arm. When operating, the web or other object being measured is located between the arms. Openings in the lower wall of the upper arm and in the upper wall of the lower arm allow transmission of the laser light beams onto the object being measured and transmission of light reflected from the light spots on the opposite surfaces of the object being measured to receiver of the sensor.

An inherent characteristic of such laser displacement sensors is that they have three critical distance specifications that define two critical parameters. Those parameters are reference distance and measurement range and they dictate sensor positioning requirements with respect to the object being measured in order for the measurements to be accurate. More specifically, the distance from the laser to the spot projected onto the surface of the object to be measured must be within the measurement range. When two laser sensors are used to measure thickness, the surfaces of the object being measured must be within the measurement range of both laser sensors.

FIG. 1 illustrates the distance specifications, the critical parameters and their relationship to prior art laser gauges. An upper laser sensor 10 is housed in an upper enclosure arm 11 of a C-frame enclosure 14 and a lower laser sensor 12 is housed in a lower enclosure arm 13 of the C-frame enclosure 14. The space between the enclosure arms 11 and 13 is an air gap (throat height or width) in which the object to be measured is positioned. The laser sensors 10 and 12 each project a light beam 16 in opposite directions onto the interposed object to be measured. The laser sensor 10 has a proximal (nearer) measurement limit 18 as one distance specification and a distal (farther) measurement limit 20 as another distance specification. The laser sensor 12 is oriented and positioned so that its proximal measurement limit is at limit 20 and its distal measurement limit is at limit 18. Midway between the measurement limits 18 and 20 is a reference point 22 that defines a reference distance from the laser sensors and is the preferred passline of a material being conveyed between the arms 11 and 13. Although each laser sensor has its own proximal limit and distal limit, in the thickness measurement configuration these measurement limits are preferably coincident as shown in FIG. 1.

For each laser sensor the surface onto which the laser light spot is projected must be at or beyond its proximal measurement limit and at or nearer than its distal measurement limit in order for the measurements to be accurate. These measurement limits define the measurement range within which the object to be measured must be confined. An example of these parameters is a laser gauge having a reference distance of 150 mm and a measurement range of ±40 mm from the reference point 22 (80 mm total measurement range). If the object being measured gets positioned outside of the measurement range, the measurement results in an error, or failure to read. For example, if the object is at position 24 or position 26, distance and thickness measurement is not able to be determined.

Laser thickness gauges in the prior art have an air gap that is considerably longer than the measurement range. That imposes measurement range restrictions because, if the material being measured moves too high or too low towards either arm, there will be a measurement failure. Consequently, if a company wants to install a laser gauge in an existing production line, they have to modify their existing production line to add material feeding and conveying equipment that controls the position of the material being sensed. The added equipment needs to maintain the material close to the passline and, under all conditions, within the measurement range. If a company is designing a new system, the design of the material conveyer must include equipment that similarly maintains the material within the same limits. In either case there is a need for the purchaser of a prior art laser gauge to provide rollers, guides, movable position systems, sometimes with position sensors, as a part of the conveyer apparatus that controls the motion and position (elevation, tension, speed) of a web or other object being measured through a conveyer in order to assure that the conveyer system always maintains the sheet within the measurement range. A prior art laser gauge cannot simply be mounted on a conveyer without such modification of the conveyer or consideration of the location of the passline.

It is therefore an object and purpose of the invention to provide a laser gauge that does not impose on the conveyer system any requirement that it control the position of a web, sheet or other object to be measured and therefore does not require any modification of an existing conveyer or additional equipment in a new design.

BRIEF SUMMARY OF THE INVENTION

Instead of the laser gauge having an air gap that includes both a central measurement range and space beyond the measurement range in which measurement failures occur, embodiments of the invention are accurate across the entire air gap thereby eliminating the need to provide modifications of or additions to the web conveyer. The invention positions the laser sensors in a sufficiently recessed position in their enclosure so that physical barriers, such as walls of the enclosure, are located at the upper and lower limits of the measurement range. This ensures that the material to be measured is not capable of moving outside of the measurement range of the sensor. More specifically, the invention is a laser gauge that has at least one laser and usually two lasers housed in a enclosure with at least two arms that are spaced apart for receipt of a target surface in an air gap between the arms. The gauge has a first enclosure barrier attached to a first one of the enclosure arms at a first boundary of the air gap. The first enclosure barrier is positioned away from the laser at or beyond the gauge's proximal measurement limit. A second enclosure barrier is attached to a second one of the enclosure arms at a second boundary of the air gap. The second enclosure barrier is positioned away from the laser at or nearer than the gauge's distal measurement limit.

BRIEF DESCRIPTION OF THE SEVERAL VIEWS OF THE DRAWINGS

FIG. 3 is a side view of a laser thickness gauge mounted in a C-frame and embodying the invention.

FIG. 4 is an end view of the laser thickness gauge of FIG. 3.

FIG. 5 is a diagrammatic view of a portion of an alternative embodiment of the invention that, if it were implemented on the embodiment of FIGS. 2-4, would be a view in section taken along the line 5-5 of FIG. 3.

Figure 1:
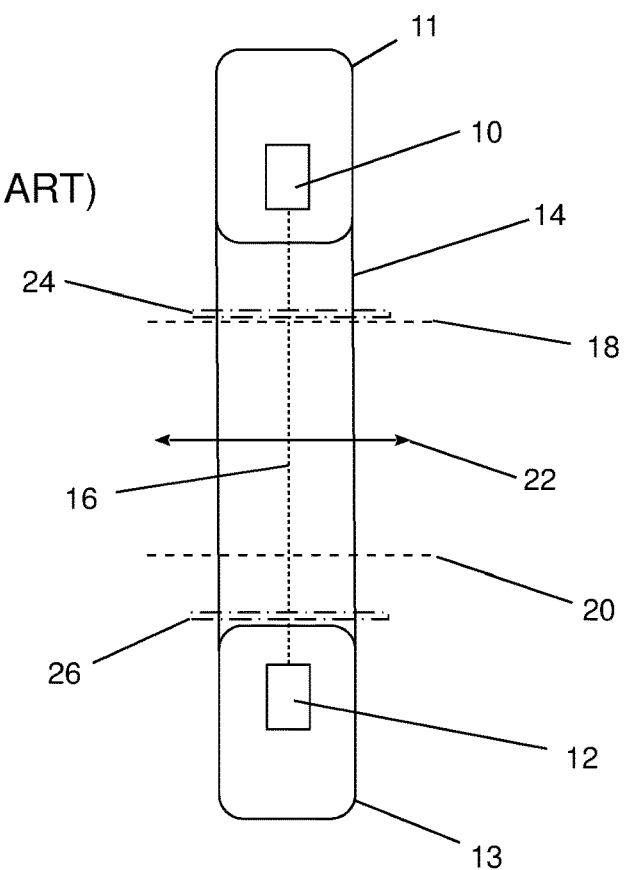
FIG. 1 is a diagrammatic end view of a prior art laser thickness gauge mounted in a C-frame.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Figure 2:
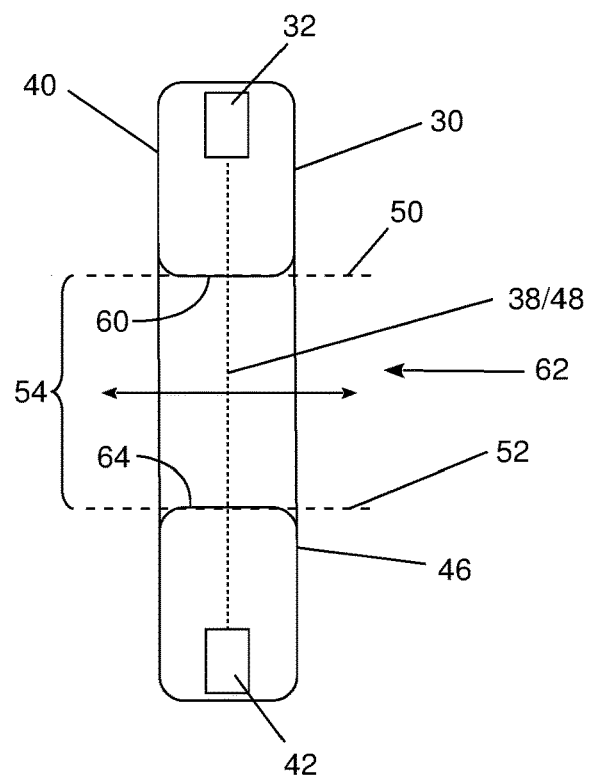
FIG. 2 is a diagrammatic end view of a laser thickness gauge mounted in a C-frame and embodying the invention.

Referring to FIGS. 2, 3 and 4, a laser gauge embodying the invention has an enclosure 30 that houses at least one laser displacement sensor 32. The laser displacement sensor 32 measures the distance to an upper target surface 36 located in the path of a light beam 38 emitted by the laser of the laser sensor 32. The laser displacement sensor 32 is housed within an upper arm 40 of the C-frame enclosure 30.

Because the embodiment of FIGS. 2-4 measures the thickness of a sheet or web 41, a second laser displacement sensor 42 is mounted to and housed within a lower arm 46 of the C-frame enclosure 30. The second laser sensor 42 measures the distance to a lower target surface 47 located in the path of a light beam 48 emitted by the laser of the second laser sensor 42. The target surfaces 36 and 47 are the opposite surfaces of the web 41 that is in or being conveyed through the air gap between the upper arm 40 and the lower arm 46.

The first laser displacement sensor 32 has a proximal measurement limit 50 and a distal measurement limit 52 that define a measurement range 54. The second laser displacement sensor 42 has a proximal measurement limit 52 and a distal measurement limit 50. These limits coincide in a reversed relationship to define the same measurement range 54.

A first and upper enclosure barrier 60 is attached to a first and upper enclosure arm 40 at a first and upper boundary of the air gap 62 between the arms 40 and 46. The first enclosure barrier 60 is positioned away from the laser sensor 32 at or beyond the upper sensor's proximal measurement limit 50. A second and lower enclosure barrier 64 is attached to the second and lower enclosure arm 46 at the second and lower boundary of the air gap 62. The second enclosure barrier 64 is positioned away from the laser sensor 32 at or nearer than the upper sensor's distal measurement limit 52.

Preferably the barriers are outer walls of the enclosure 30 which define the boundaries of the air gap 62. In particular, the first enclosure barrier 60 may be the enclosure wall that covers the lower part of the upper enclosure arm 40 and the second enclosure barrier 64 may be the enclosure wall that covers the upper part of the lower enclosure arm 46. As illustrated in FIG. 5, an alternative to forming the barriers from enclosure walls can be implemented by forming the barriers as bars or rollers 66 attached to the arms of the enclosure 30 in the same locations. Although FIG. 5 shows only the bars or rollers 66 on the first arm, the bars or rollers on the second arm would be shown as an inverted image of FIG. 5. The bars, rollers or other barriers used with the invention must leave open line-of-sight paths for the laser light beams to strike the surface of the object being measured and for the image receiver to see the spot of light on the object.

It should be apparent that, although the figures and their description describe a gauge with a vertically oriented air gap for passage of a horizontally oriented web, the laser gauge can be mounted in any oblique orientation that is adapted for measuring a web or other object with a non-horizontal orientation.

The invention positions barriers, which are an integral part of the laser gauge enclosure, at positions where they are at both the opposite, upper and lower sides of the air gap and at or slightly within the boundaries of the measurement range of the laser sensors. That requires that the upper laser sensor and the lower laser sensor be recessed respectively far enough above and far enough below the boundaries of the air gap. Consequently the entire throat height or air gap of a C-frame is the measurement range. If the material passes through this frame at any height it will be accurately measured. The result is that a conveyer system no longer requires any control apparatus for controlling the position of a web travelling between the arms. The web can even slide along the barriers that define the air gap. This makes the system more flexible and more easily deployed.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An improved laser gauge, the gauge having an enclosure that houses at least one laser sensor for measuring at least the distance to a target surface located in the path of light emitted by the laser sensor, each laser sensor having a proximal measurement limit and a distal measurement limit that define a measurement range, the enclosure having at least two enclosure arms that are spaced apart for receipt of the target surface in an air gap between the arms, one of said enclosure arms being a proximal enclosure arm and the other enclosure arm being a distal enclosure arm, the gauge further comprising:
   (a) a proximal enclosure barrier attached to the proximal enclosure arm at a proximal boundary of the air gap, the proximal enclosure barrier being positioned away from said one laser sensor at or beyond the proximal measurement limit of said one laser sensor; and
   (b) a distal enclosure barrier attached to the distal enclosure arm at a second boundary of the air gap, the distal enclosure barrier being positioned away from said one laser sensor at or nearer than the distal measurement limit of said one laser sensor.

2. An improved laser gauge, the gauge having an enclosure that houses at least one laser sensor for measuring at least the distance to a target surface located in the path of light emitted by the laser sensor, each laser sensor having a proximal measurement limit and a distal measurement limit that define a measurement range, the enclosure having at least two enclosure arms that are spaced apart for receipt of the target surface in an air gap between the arms, the gauge further comprising:
   (a) a first enclosure barrier attached to a first one of the enclosure arms at a first boundary of the air gap, the first enclosure barrier being positioned away from said one laser sensor at or beyond the proximal measurement limit of said one laser sensor; and
   (b) a second enclosure barrier attached to a second one of the enclosure arms at a second boundary of the air gap, the second enclosure barrier being positioned away from said one laser sensor at or nearer than the distal measurement limit of said one laser sensor wherein the enclosure further has a second laser sensor forming a displacement sensor, wherein the light from said one laser sensor is directed from one enclosure arm into the air gap and light from the second laser sensor is directed from the second enclosure arm into the air gap and wherein the enclosure barriers are positioned at or within the measurement range of both displacement sensors making the gauge capable of measuring the thickness of a web throughout the entire range of the air gap.

3. A gauge according to claim 2 wherein the barriers are outer walls of the enclosure and define boundaries of the air gap.

4. A gauge according to claim 3 wherein the first enclosure barrier is an enclosure wall that covers a lower part of an upper arm and the second enclosure barrier is an enclosure wall that covers an upper part of a lower enclosure arm.

5. A gauge according to claim 2 wherein the barriers comprise bars or rollers attached to the enclosure.

6. A gauge according to claim 5 wherein the barriers are attached to the arms of the enclosure and define the boundaries of an air gap between the arms.

* * * * *